Figure 1:
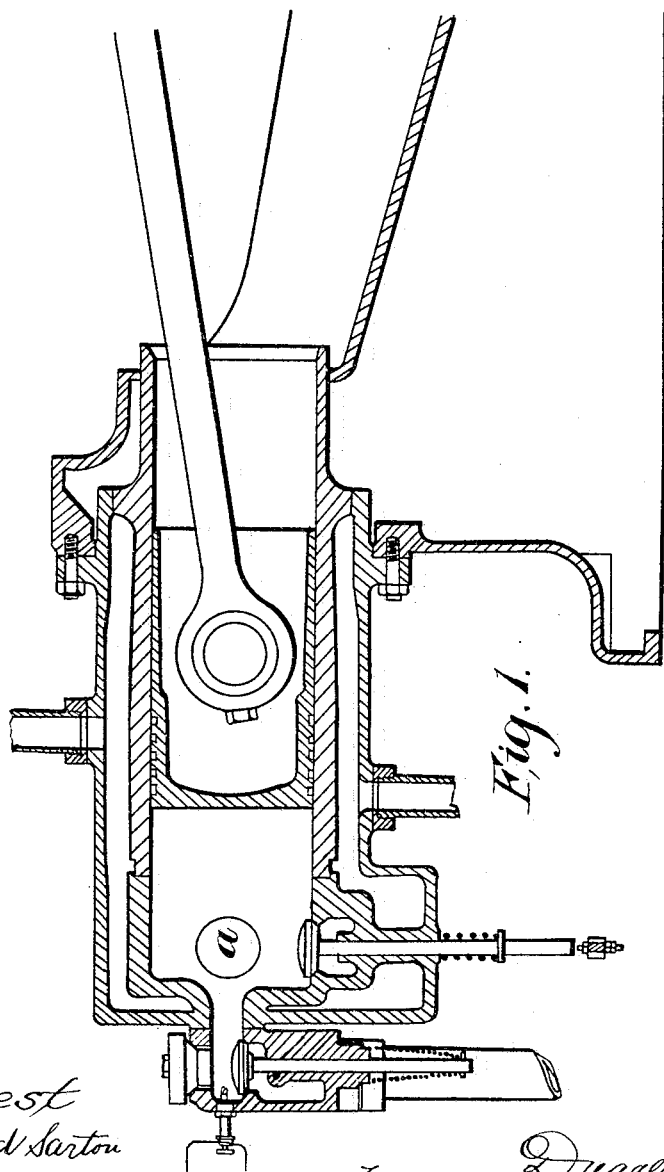

No. 769,589. PATENTED SEPT. 6, 1904.
D. CLERK.
GAS OR OTHER INTERNAL COMBUSTION ENGINE.
APPLICATION FILED MAY 14, 1904.
NO MODEL. 2 SHEETS—SHEET 1.

Attest
Edward Sarton
L. B. Middleton.

Inventor
Dugald Clerk
by
Spear, Middleton, Donaldson & Spear
Attys.

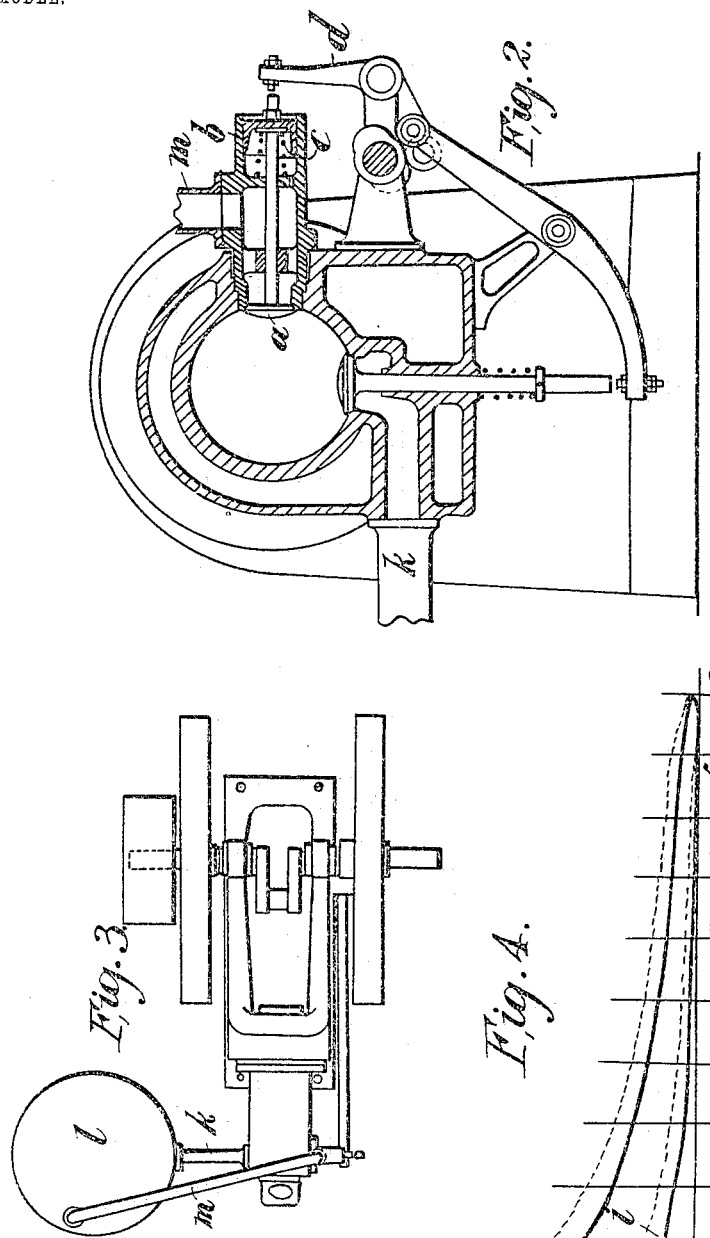

No. 769,589. Patented September 6, 1904.

UNITED STATES PATENT OFFICE.

DUGALD CLERK, OF EWHURST, ENGLAND.

GAS OR OTHER INTERNAL-COMBUSTION ENGINE.

SPECIFICATION forming part of Letters Patent No. 769,589, dated September 6, 1904.

Application filed May 14, 1904. Serial No. 208,035. (No model.)

*To all whom it may concern:*

Be it known that I, DUGALD CLERK, a subject of the King of Great Britain and Ireland, residing at Little Woolpits, Ewhurst, in the county of Surrey, England, have invented certain new and useful Improvements in Gas or other Internal-Combustion Engines, of which the following is a specification.

My invention relates to internal-combustion engines, and mainly to gas and heavy or light oil engines in which the cylinder is charged at a pressure exceeding atmospheric pressure, so that when compression is completed higher compression-pressures are obtained with given clearance or combustion-space volumes.

My object is to produce internal-combustion engines in which high-average pressures are obtained with low maximum and mean temperatures and also to improve the operation of such engines, so as to enable them to run smoothly at high speeds.

My invention consists in adding to the charge of an internal-combustion engine working on the "Otto," "Clerk," or other cycle using compression, either before, during, or near the end of the compression-stroke, a charge of steam in such a way as to increase the compression-pressure without diminishing the volume of ordinary combustible mixture, whereby the weight of the total charge present is increased and an impulse obtained with decreased maximum and mean temperatures and also increased mean pressures.

In the accompanying drawings, Figures 1 and 2 are sectional side and end elevations of a gas-engine adapted according to one modification of the invention. Fig. 3 is a diagrammatic plan illustrating the connection of the engine to a steam-generator. Fig. 4 is an indicator-diagram such as would be taken off an engine working in accordance with the invention.

In carrying the invention into effect according to one modification we add to the charge of, say, an Otto-cycle gas-engine a supply of steam under such pressure as to increase the total weight of gaseous matter present in the cylinder before compression begins. This steam is to be added after the ordinary charge is drawn into the Otto-cycle cylinder in such a way as to increase the pressure before compression without diminishing the volume of the charge admitted. The mixed inflammable charge and steam is then compressed and an impulse is produced by explosion in the usual way. The maximum temperature, however, is reduced, while the mean pressure is increased.

The steam employed may be generated in any convenient manner and led, for example, to a steam-inlet valve $a$, Fig. 1. This valve is provided with a counterbalance-piston $b$, which, in conjunction with a spring $c$, is designed to normally retain the valve $a$ closed against the pressure of the steam. The valve $a$ is opened by a tappet-lever $d$, rocked by a cam on the usual cam-shaft, the cam being so set that it opens the valve at the beginning, during, or near the end of the compression-stroke.

Referring to Fig. 4, the curve indicated in full line represents the indicator-diagram obtained under ordinary conditions. The dotted curve $e\ f\ g$ represents the curve such as would be obtained during the compression-stroke on the same engine, but with low-pressure steam added at the beginning of the compression-stroke, the rise indicated at $f$ denoting the point at which steam was admitted. The dotted curve $g\ h$ indicates the rise in pressure due to the explosion, while the remainder of the dotted curve $h\ e$ indicates the fall due to expansion during the working stroke. The short curve $i\ j$ indicates the increase in pressure occurring when steam is admitted near the end of the compression-stroke, as at a point $i$. In this case the steam should be at a high enough pressure to supply the required additional charge of elastic fluid. The pressure of supply is, as shown in the diagram, about one hundred and fifty pounds per square inch.

By comparison of the two diagrams it will be noticed that the area of the dotted diagram representing the work performed in the cylinder according to the invention is greater than the area of the full-line diagram representing the work performed under the usual Otto cycle. Although a higher mean pressure is obtained, the addition of the steam effects a decrease in the mean and maximum temperatures.

When a gas-producer is employed to generate the gas for the engine, the steam-generator used for the producer may supply the steam for the engine; but when town gas or heavy or light oils are used for the engine the steam may be generated in a special boiler, preferably wholly or partially heated by the waste exhaust-gases of the engine. Thus, as indicated by Fig. 3, the exhaust-pipe $k$ may be led to a multitubular boiler $l$, the steam generated in which is led to the steam-inlet valve $a$ of the engine by a pipe $m$. Any suitable form of boiler, however, may be employed.

Although I have only described my invention as applied in Otto-cycle engines, it will readily be seen that it can be applied also in engines working on the Clerk, Robson, or other cycles.

Having now described my invention, what I claim as new, and desire to secure by Letters Patent, is—

In an internal-combustion engine the combination with the cylinder and means for supplying a combustible mixture thereto, of means for supplying steam under pressure to said cylinder during the compression-stroke of the piston, substantially as described.

In witness whereof I have hereunto set my hand in presence of two witnesses.

DUGALD CLERK.

Witnesses:
ALBERT E. PARKER,
GEORGE I. BRIDGES.